Jan. 29, 1957   F. D. HARRIS   2,779,487
VEHICLE MOUNTED HANDLING DEVICE FOR PALLET STACKS
Filed Jan. 14, 1955   4 Sheets-Sheet 1

INVENTOR
FRANCIS D. HARRIS

BY
McMorrow, Berman + Davidson
ATTORNEYS

Jan. 29, 1957 F. D. HARRIS 2,779,487
VEHICLE MOUNTED HANDLING DEVICE FOR PALLET STACKS
Filed Jan. 14, 1955 4 Sheets-Sheet 2

INVENTOR
FRANCIS D. HARRIS

BY
McMorrow, Berman + Davidson
ATTORNEYS

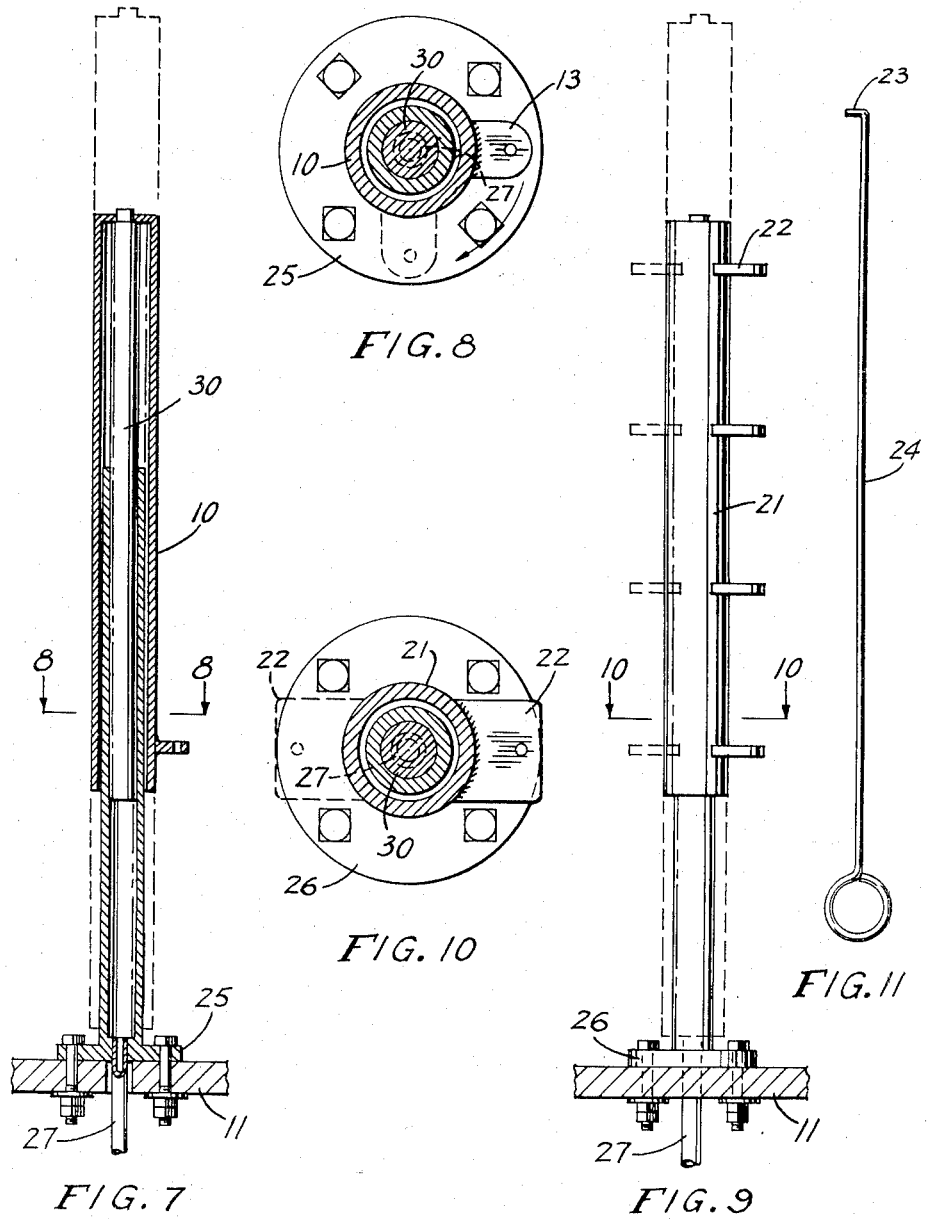

Jan. 29, 1957     F. D. HARRIS     2,779,487
VEHICLE MOUNTED HANDLING DEVICE FOR PALLET STACKS
Filed Jan. 14, 1955     4 Sheets-Sheet 4

INVENTOR
FRANCIS D. HARRIS

BY
McMorrow, Berman & Davidson
ATTORNEYS

United States Patent Office 2,779,487
Patented Jan. 29, 1957

2,779,487
VEHICLE MOUNTED HANDLING DEVICE FOR PALLET STACKS

Francis D. Harris, Lyndhurst, N. J.

Application January 14, 1955, Serial No. 481,762

1 Claim. (Cl. 214—75)

The present invention relates to a device for loading and unloading stacked shelves carried by and supported by a mobile platform.

The principal object of the present invention is to provide a device to be attached to the platform of a vehicle such as a truck for loading and unloading shelves carried by the truck on a platform, which shelves may be handled singly and separately or in a group with or without a load of cases or boxes on each shelf.

Another object of the present invention is to provide a truck platform with hydraulic jacks for lifting a series of shelves from a stacked condition to a shelved condition.

A further object of the present invention is to provide a device which attaches to a hydraulic jack and is swingably movable from a position at which it will engage a shelf to a position disengaging the shelf.

A still further object of the present invention is to provide a shelf of particular design which may be stacked in a condition in which each shelf is spaced from the one beneath it and the one above it and in a condition in which the shelves are nested together, to conserve space, as in a warehouse.

These and other objects and advantages of the present invention will be fully apparent from the following description when considered in connection with the annexed drawings, in which:

Figure 7 is a side view in cross section on line 7—7 of Figure 3;

Figure 8 is a vertical view in cross section on line 8—8 of Figure 7;

Figure 9 is a side view in elevation of a further embodiment of the present invention;

Figure 10 is a vertical view in cross section on line 10—10 of Figure 9;

Figure 11 shows a tool for use with either of the embodiments shown in Figures 7 to 10;

Referring in greater detail to the drawings in which like numerals indicate like parts throughout the several views, the invention is seen to consist of upstanding hydraulic jacks 10 connected at their lower ends to the platform 11 of a truck 12.

Figure 1:
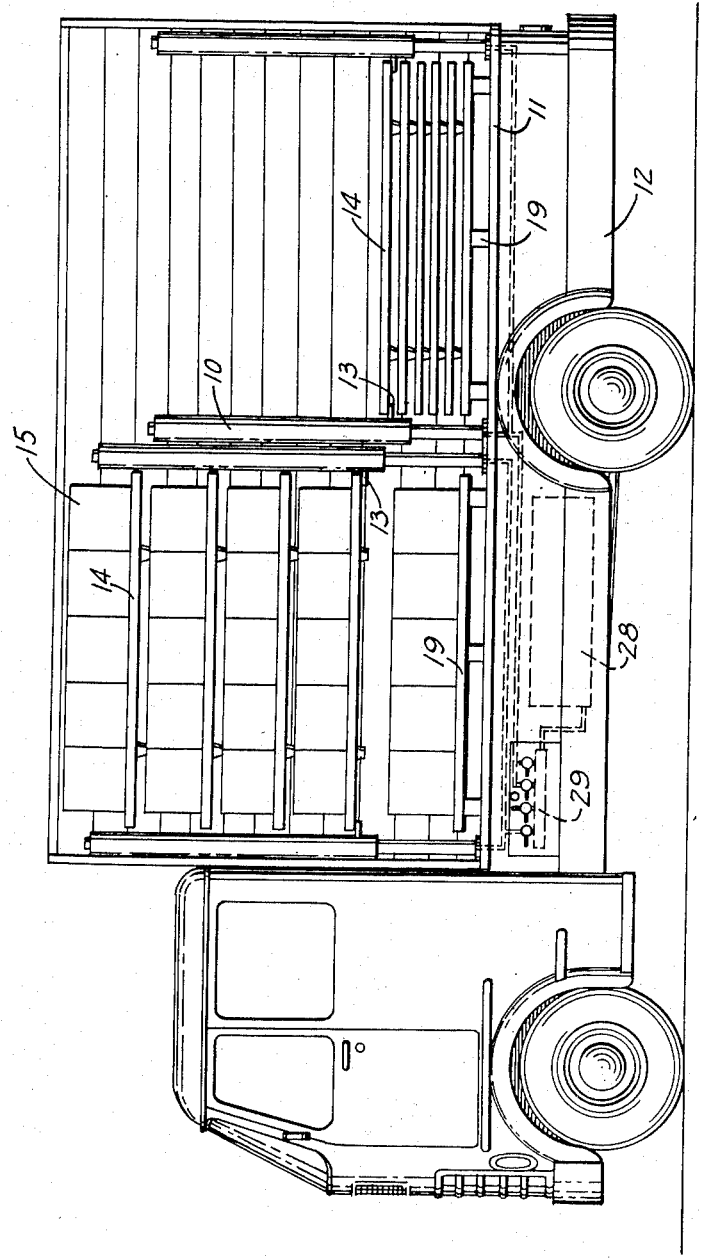
Figure 1 is a side view in elevation of a truck body having a platform with the present invention secured to the platform and showing a condition at one end of a stack of unloaded shelves, and at the other end a condition of loaded shelves with boxes or cases carried on the shelves.

Each of the hydraulic jacks 10 of the first embodiment of the present invention have a single lip 13 projecting outwardly on one side, as seen in Figure 1, to engage the one end of a specially formed shelf 14 for raising and lowering the shelf in order that packages such as cases or boxes indicated generally by the reference numeral 15 in Figure 1 may be removed therefrom.

Each of the shelves 14, as seen in Figures 2 to 6, is formed with a truncated hole indicated at 16 and a cup-shaped leg 17 so that the shelves 14 may be nested together with the cup 17 of one shelf fitting into the hole 16 of a shelf immediately adjacent. In this latter condition, the nested shelves are ready for storage in a warehouse and they would not be used in this condition on the truck.

Figure 2:
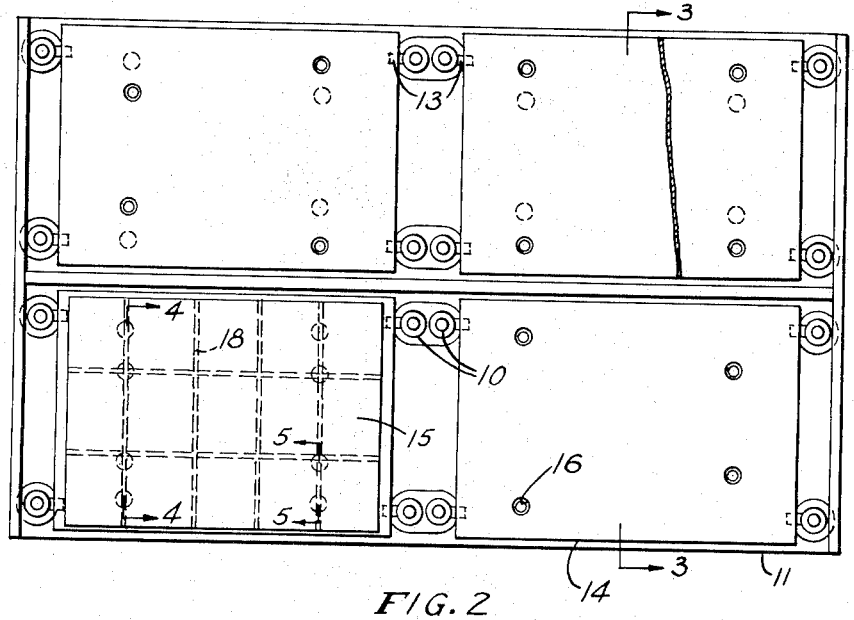
Figure 2 is a top plan view of a truck platform showing the relative position of the hydraulic jacks with respect to the shelves carried on the platform.
Figure 3:
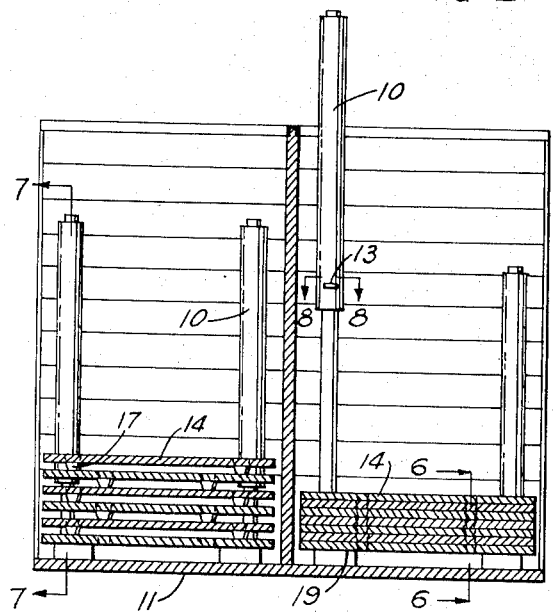
Figure 3 is an end view in cross section on line 3—3 of Figure 2.
Figures 5, 6:
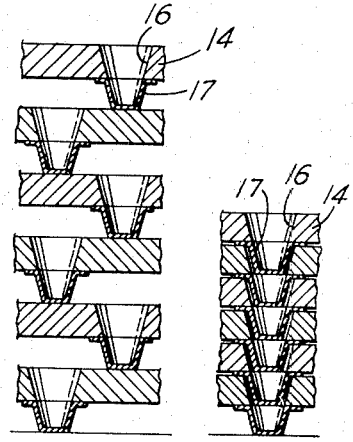
Figure 5 is an end view in cross section on line 5—5 of Figure 2.
Figure 6 is an end view in cross section on line 6—6 of Figure 3.
Figure 4:
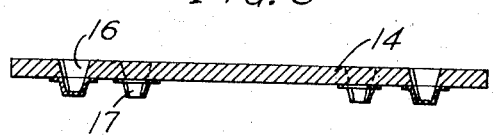
Figure 4 is an end view in cross section on line 4—4 of Figure 2.

As shown most particularly in Figures 2 and 5, the hole 16 and cup 17 are in alignment and are spaced on each one of the shelves 14 at one end closer together than at the other end so that when shelves are reversed in alternating manner, they may be separated one from the other in one stacked position and may be nested together in another stacked position, for storage in a compact condition.

Referring again to Figure 1, the boxes or cases 15 are seen stacked on shelves 14 and in this condition of stacking the cases 15 must be of equal height, or dummy cases inserted, in order that the shelf members 19 be kept horizontal. This condition of stacking is arrived at by having the conventional pallet shown at 19 preloaded at the factory or the warehouse with a shelf 14 interposed between each row of cases 15. A lift truck or other means brings the loaded pallet 19 to the side of the truck and lifts it to the platform 11.

Unloading of the pallet 19 is accomplished by using the hydraulic jack 10 to lift anyone of the shelves 14 on its lip 13 to make available anyone of the cases 15 from the pallet 19 and successively all of the cases from each one of the shelves 14 by lowering the next adjacent shelf 14 to face to face contact with the unloaded and empty pallet 19.

The unloaded shelves 14 may be then left upon the pallet 19 and removed by some conventional means upon its return to the factory or the warehouse.

When used with case goods having sufficiently rigid walls such as milk bottle cases which are normally stacked together, the shelves 14 may be used to separate and support each row of cases with the legs 17 supported on the edges of the cases, or they may be spaced to fit between the edges or between the bottles.

Figure 12:
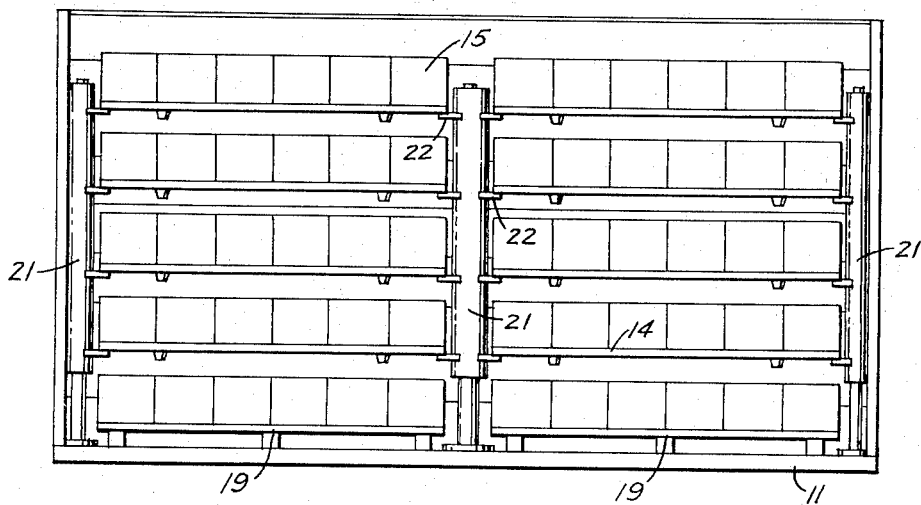
Figure 12 is a side view of the truck platform as in one condition of loading.
Figure 13:
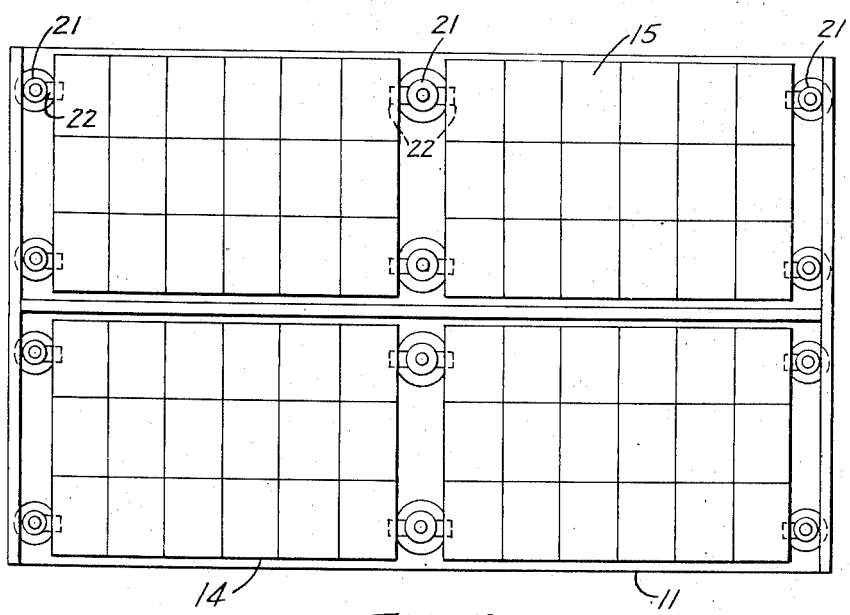
Figure 13 is a vertical view of the truck platform in the condition of loading, as seen in Figure 12.

In Figures 9 and 10 a second embodiment of the present invention is shown in which the hydraulic jack 21 is provided with a plurality of lips 22 spaced from each other. In Figures 12 and 13 another condition of loading of a truck platform 11 is seen in which a single hydraulic jack 21 separates the two stacks of shelves 14. Other hydraulic jacks 21 are at the end of the platform for supporting the other ends of the shelves and suitable controls are furnished for raising all of the hydraulic jacks on one side of the platform simultaneously so that the rows of cases may be raised and lowered and loaded on the truck shelves.

The lips 22 in the second embodiment are positioned on each side of the hydraulic jack 21 to engage adjacent edge portions of the shelves.

Each of the lips 13 and 22 are provided with a hole in which to put the hook end 23 of the rod 24 for swinging the lip around on its jack to the disengaged position.

Each of the hydraulic jacks 10 and 21 are provided with flanges 25 and 26, respectively, by which they are bolted to the platform 11 and are connected by the conduits 27 to a source of hydraulic fluid under pressure indicated at Figure 1 generally at 28 with suitable valve control means indicated generally at 29. Each of the hydraulic jacks 10 and 21 are conventionally made with a piston 30 movable up and down with respect to the platform 11. Conventional locking means (not shown) may be used to support the hydraulic jacks in any extended position.

It will be seen that the present invention, therefore, assists in the work of loading and unloading a truck, and while only cases and boxes have been here illustrated and described, and the truck body divided into four shelf receiving spaces, other spaces may be provided and any number of hydraulic jacks positioned opposed from each other, with the shelves between, may be accommodated.

Further, while a single platform truck has been illustrated, it is contemplated that the invention may be modified to include double platform trucks and also closed trucks with the hydraulic jacks positioned between the platform or floor and the roof.

While preferred embodiments have been here shown and described, other embodiments of the present invention may be made and practised and many changes and modifications may be made within the scope of the appended claims without departing from the spirit of the invention.

What is claimed is:

For use with a vehicle having a platform, a device for loading and unloading stacked shelves operatively connected to said platform, said device comprising opposed upstanding jacks fixed to said platform, each of said jacks being movable upward and downward with respect to said platform, a plurality of shelves arranged in stacked relation superimposed on said platform between said jacks, means on said shelves for separating said shelves from each other when in one stacked position and for nesting said shelves together when in a second stacked position, means carried by each of said jacks and engageable with an adjacent edge portion of each shelf for raising the latter to a shelf position in response to the upward movement of said jacks and for lowering said shelf to said one stacked position in response to the downward movement of said jacks, and means connecting the opposed jacks for effecting the upward and downward movements of said jacks together.

References Cited in the file of this patent

UNITED STATES PATENTS

| | | |
|---|---|---|
| 1,457,639 | Straight | June 5, 1923 |
| 1,590,296 | Klein et al. | June 29, 1926 |
| 1,944,351 | Landry | Jan. 23, 1934 |
| 2,447,959 | Phillips et al. | Aug. 24, 1948 |
| 2,459,045 | Pride | Jan. 11, 1949 |
| 2,544,657 | Cushman | Mar. 13, 1951 |
| 2,647,646 | Naillon | Aug. 4, 1953 |

FOREIGN PATENTS

| | | |
|---|---|---|
| 450,251 | Great Britain | July 7, 1936 |